US012668292B2

(12) United States Patent
Sun et al.

(10) Patent No.: US 12,668,292 B2
(45) Date of Patent: Jun. 30, 2026

(54) VEHICLE FRAME AND STROLLER

(71) Applicant: Wonderland Switzerland AG,
Steinhausen (CH)

(72) Inventors: Mingxing Sun, Steinhausen (CH);
Shoufeng Hu, Steinhausen (CH)

(73) Assignee: **WONDERLAND SWITZERLAND
AG**, Steinhausen (CH)

( * ) Notice: Subject to any disclaimer, the term of this
patent is extended or adjusted under 35
U.S.C. 154(b) by 650 days.

(21) Appl. No.: 17/728,944

(22) Filed: Apr. 25, 2022

(65) Prior Publication Data

US 2022/0348247 A1      Nov. 3, 2022

(30) Foreign Application Priority Data

Apr. 28, 2021      (CN) .......................... 202110465579.9

(51) Int. Cl.
B62B 7/06           (2006.01)
B62B 7/00           (2006.01)
(Continued)

(52) U.S. Cl.
CPC .............. B62B 7/062 (2013.01); B62B 7/064
(2013.01); B62B 7/08 (2013.01); B62B 7/004
(2013.01); B62B 9/26 (2013.01); **B62B
2205/24** (2013.01)

(58) Field of Classification Search
CPC   B62B 7/062; B62B 7/064; B62B 7/08; B62B
7/06
See application file for complete search history.

(56) References Cited

U.S. PATENT DOCUMENTS 5,516,142 A * 5/1996 Hartan ...................... B62B 7/06
280/655.1
8,905,428 B2 * 12/2014 Schroeder ................. B62B 7/08
280/650
(Continued)

FOREIGN PATENT DOCUMENTS

CN          201545032 U      8/2010
CN          203402225 U      1/2014
(Continued)

OTHER PUBLICATIONS

First Office Action issued in Chinese Application No. 202110465579.
9, dated Jul. 6, 2024; 43 pgs.
(Continued)

*Primary Examiner* — Emma K Frick
(74) *Attorney, Agent, or Firm* — HAUPTMAN HAM,
LLP

(57)              ABSTRACT
A stroller includes a texture carrier, a wheel set and a vehicle
frame. The wheel set includes a front wheel and a rear wheel.
The vehicle frame includes a first tube, a second tube, a third
tube, a fourth tube and a first pivot unit. The front wheel is
disposed on the first tube. The rear wheel is disposed on the
second tube. The third tube includes a front section and a
rear section connected to each other. The fourth tube is
pivoted between the first tube and the second tube. The first
pivot unit is disposed between the second tube and the fourth
tube. The first pivot unit switched into an unfolded mode can
stabilize the first tube and the fourth tube at the same
direction. The pivot unit switched into a folded mode can
rotate the fourth tube relative to the first tube and the second
tube.

21 Claims, 10 Drawing Sheets

(51) Int. Cl.
    *B62B 7/08*           (2006.01)
    *B62B 9/26*           (2006.01)

(56) References Cited

U.S. PATENT DOCUMENTS

| | | | | |
|---|---|---|---|---|
| 8,961,057 | B2 * | 2/2015 | Schroeder | F16C 11/10 |
| | | | | 280/647 |
| 9,545,940 | B2 * | 1/2017 | Taylor | B62B 7/142 |
| 9,855,964 | B2 * | 1/2018 | Sack | B62B 7/10 |
| 9,884,640 | B2 * | 2/2018 | Li | B62B 7/08 |
| 10,414,423 | B2 * | 9/2019 | Zhong | B62B 7/08 |
| 10,414,424 | B2 * | 9/2019 | Yuan | B62B 7/08 |
| 11,155,292 | B2 * | 10/2021 | Duan | B62B 7/08 |
| 11,203,371 | B2 * | 12/2021 | Zhong | B62B 7/08 |
| D969,034 | S * | 11/2022 | Huntley | D12/129 |
| 11,484,129 | B2 * | 11/2022 | Zhang | A47D 1/004 |
| 11,584,422 | B2 * | 2/2023 | Fu | B62B 9/12 |
| 11,787,461 | B2 * | 10/2023 | Bell | B62B 7/145 |
| | | | | 280/47.41 |
| 11,912,328 | B2 * | 2/2024 | Li | B62B 7/064 |
| 2008/0079240 | A1 * | 4/2008 | Yeh | B62B 7/08 |
| | | | | 280/642 |
| 2015/0076775 | A1 * | 3/2015 | Wu | B62B 7/08 |
| | | | | 280/38 |
| 2016/0311455 | A1 * | 10/2016 | Li | B62B 7/145 |
| 2017/0096158 | A1 * | 4/2017 | Hanson | B60B 33/026 |
| 2018/0134306 | A1 | 5/2018 | Chen | |
| 2020/0101996 | A1 * | 4/2020 | Duan | B62B 7/08 |
| 2020/0216108 | A1 * | 7/2020 | Li | B62B 7/08 |
| 2021/0070344 | A1 | 3/2021 | Guo et al. | |
| 2023/0406391 | A1 * | 12/2023 | Song | B62B 7/042 |
| 2024/0375699 | A1 * | 11/2024 | Hu | B62B 7/06 |

FOREIGN PATENT DOCUMENTS

| | | | | |
|---|---|---|---|---|
| CN | 204309861 | U | 5/2015 | |
| CN | 106143575 | A | 11/2016 | |
| CN | 206615265 | U | 11/2017 | |
| CN | 108297926 | A * | 7/2018 | B62B 7/062 |
| CN | 111409682 | A | 7/2020 | |
| EP | 1459957 | A1 | 9/2004 | |
| EP | 2700559 | A2 | 2/2014 | |
| JP | 7498310 | B2 * | 6/2024 | B62B 7/06 |
| TW | 417630 | | 1/2001 | |
| TW | M440917 | U | 11/2012 | |
| WO | 2020051872 | A1 | 3/2020 | |

OTHER PUBLICATIONS

First Office Action in Corresponding Taiwan Application No. 113121641, dated Apr. 17, 2025; 9 pgs.

* cited by examiner

VEHICLE FRAME AND STROLLER

BACKGROUND OF THE INVENTION

1. Field of the Invention

The present invention relates to a vehicle frame and a stroller, and more particularly, to a vehicle frame capable of being overall folded and the vehicle frame and a related stroller having simple operation and convenient usage.

2. Description of the Prior Art

In design of the vehicle frame and the frame structure, the stroller is designed to be foldable for meeting practicality and convenience required by the consumer. The stroller can be fully unfolded when being in use, and further can be folded into a smaller size for easy collection or portability. The front leg, the rear leg and the handle of the conventional frame are foldable, and two folding mechanisms are respectively disposed between the front leg and the rear leg, and further between the front leg and the handle. Or, the folding mechanisms are respectively disposed between the front leg and the rear leg, and further between the rear leg and the handle. When the vehicle frame is folded, the user bends down to fold the front leg and the rear leg, and then stand up to fold the handle for switching the vehicle frame into the folded mode. Therefore, two hands of the user are applied for folding and unfolding the stroller. The conventional vehicle frame and the conventional frame structure have drawbacks of complicated operation and inconvenient usage. Design of the vehicle frame and the related stroller having simple operation and convenient usage is an important issue in the mechanical design industry.

SUMMARY OF THE INVENTION

The present invention provides a vehicle frame capable of being overall folded and the vehicle frame and a related stroller having simple operation and convenient usage for solving above drawbacks.

According to the claimed invention, a vehicle frame includes a first bar, a second bar, a third bar, a fourth bar and a first pivot unit. The first bar is adapted to connect with a front wheel. The second bar is adapted to connect with a rear wheel. The third bar has a front section and a rear section connected with each other. The front section is pivoted to an upper section of the first bar, and the rear section is pivoted to a lower section of the second bar. The fourth bar is pivoted between the first bar and the second bar. The first pivot unit is disposed between the second bar and the fourth bar, and movably switched between an unfolded mode and a folded mode. The first bar and the fourth bar are stabilized at the same direction via the first pivot unit switched to the unfolded mode, so that the front wheel is distant from the rear wheel. The fourth bar is rotated relative to the first bar and the second bar via the first pivot unit switched to the folded mode, so that the front wheel is moved toward the rear wheel.

According to the claimed invention, a stroller includes a texture carrier, a wheel set and a vehicle frame. The wheel set includes a front wheel and a rear wheel. The vehicle frame is adapted to hold the texture carrier. The vehicle frame includes a first bar, a second bar, a third bar, a fourth bar and a first pivot unit. A bottom end of the first bar is adapted to connect with the front wheel. A bottom end of the second bar is adapted to connect with the rear wheel. The third bar has a front section and a rear section connected with each other. The front section is pivoted to an upper section of the first bar, and the rear section is pivoted to a lower section of the second bar. The fourth bar is pivoted between the first bar and the second bar. The first pivot unit is disposed between the second bar and the fourth bar, and movably switched between an unfolded mode and a folded mode. The first bar and the fourth bar are stabilized at the same direction via the first pivot unit switched to the unfolded mode, so that the front wheel is distant from the rear wheel. The fourth bar is rotated relative to the first bar and the second bar via the first pivot unit switched to the folded mode, so that the front wheel is moved toward the rear wheel.

BRIEF DESCRIPTION OF THE DRAWINGS

FIG. 1 and FIG. 2 respectively are diagrams of a stroller switched to an unfolded mode in different views according to a first embodiment of the present invention.

DETAILED DESCRIPTION

Figure 2:
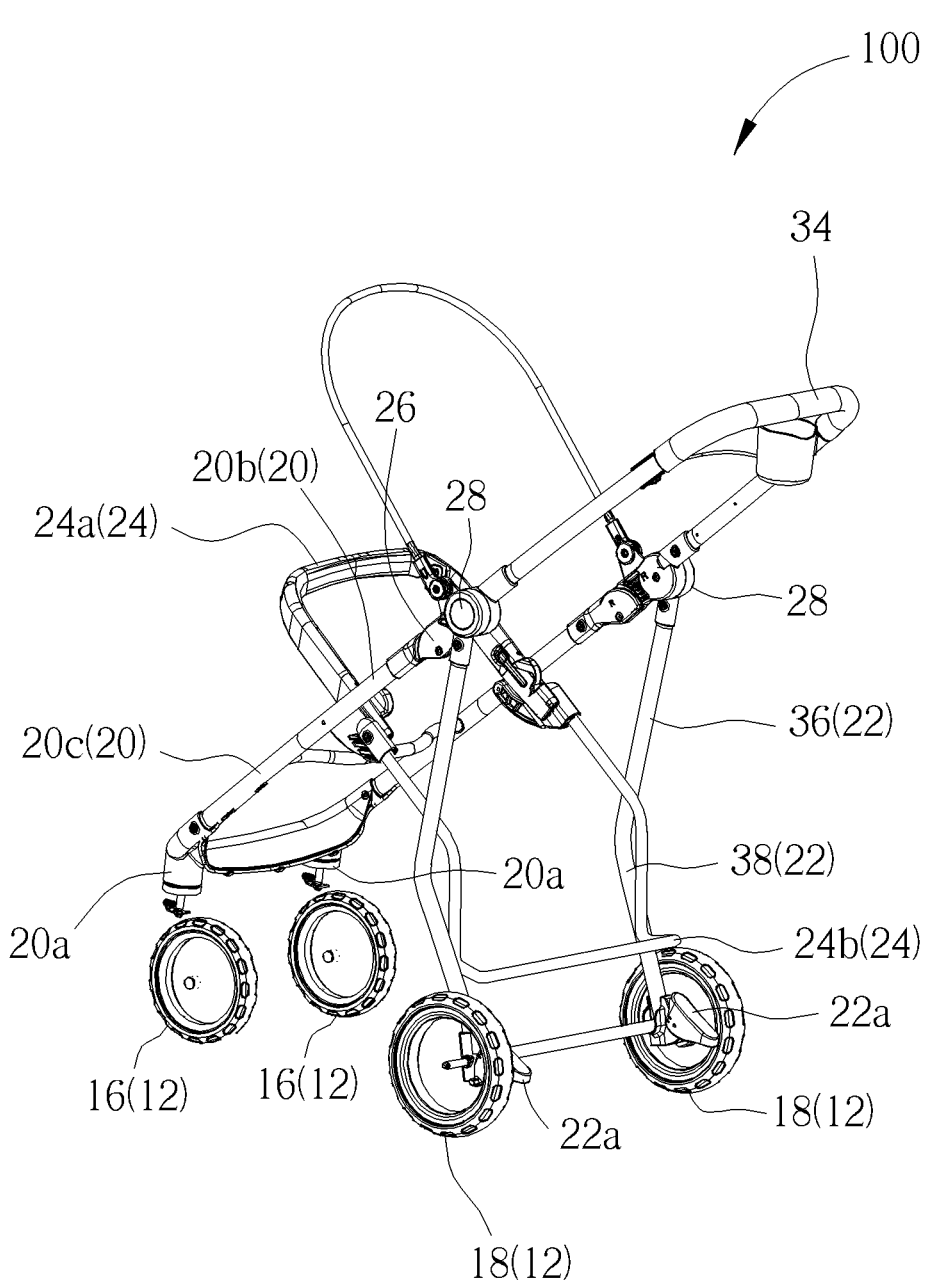
Figure 3:
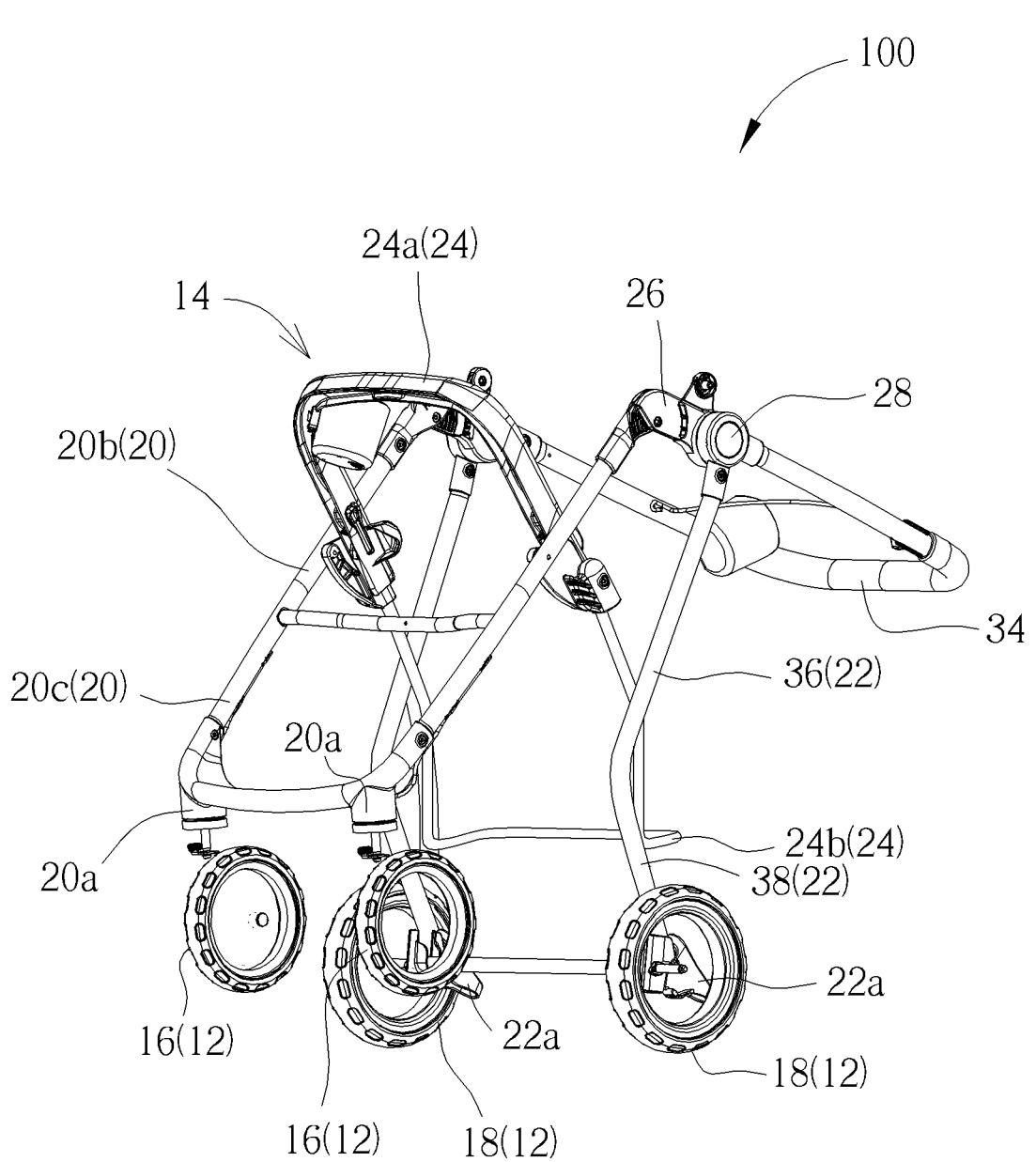
FIG. 3 and FIG. 4 respectively are diagrams of the stroller switched from the unfolded mode to a folded mode in different views according to the first embodiment of the present invention.
Figure 4:
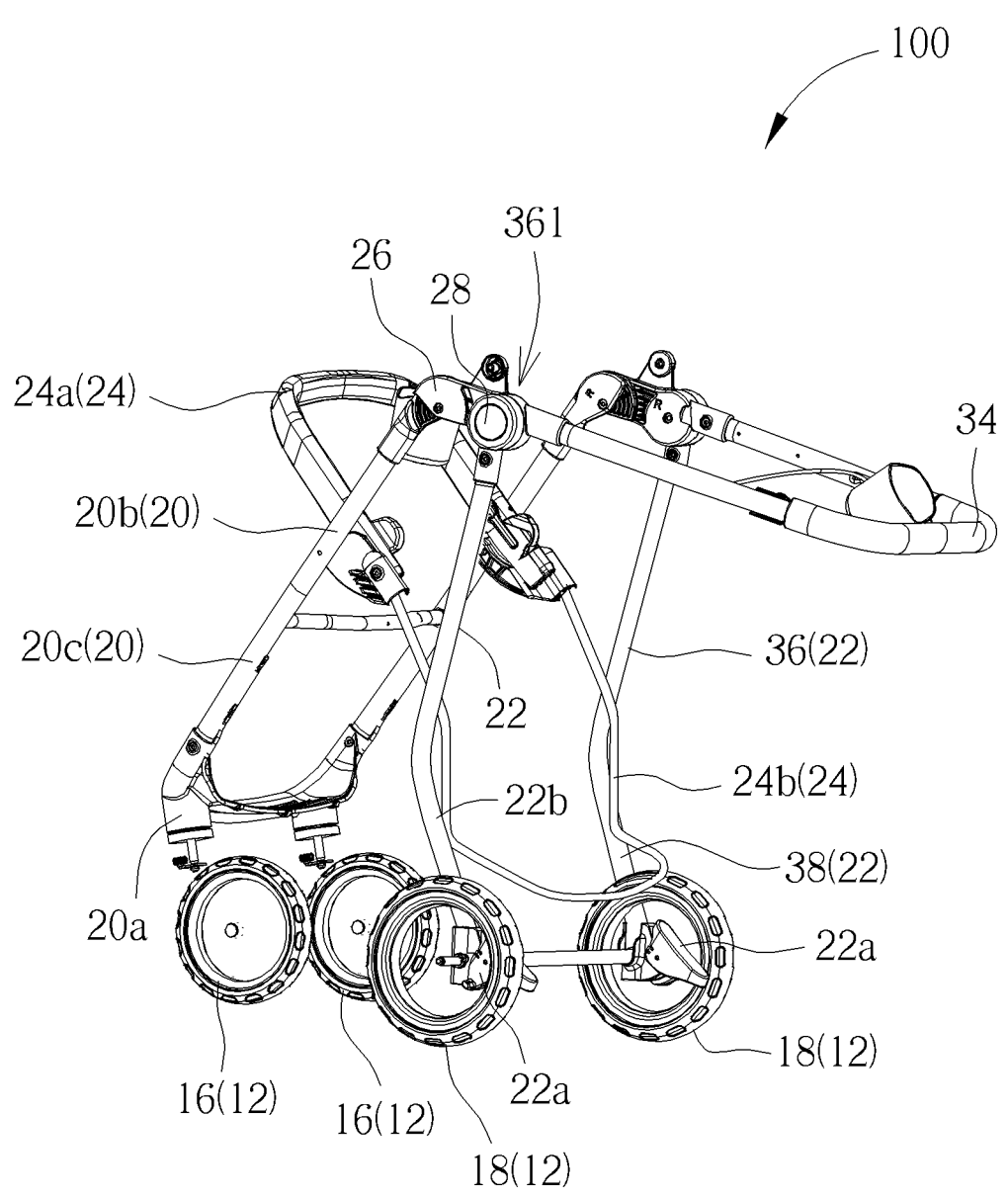
Figure 5:
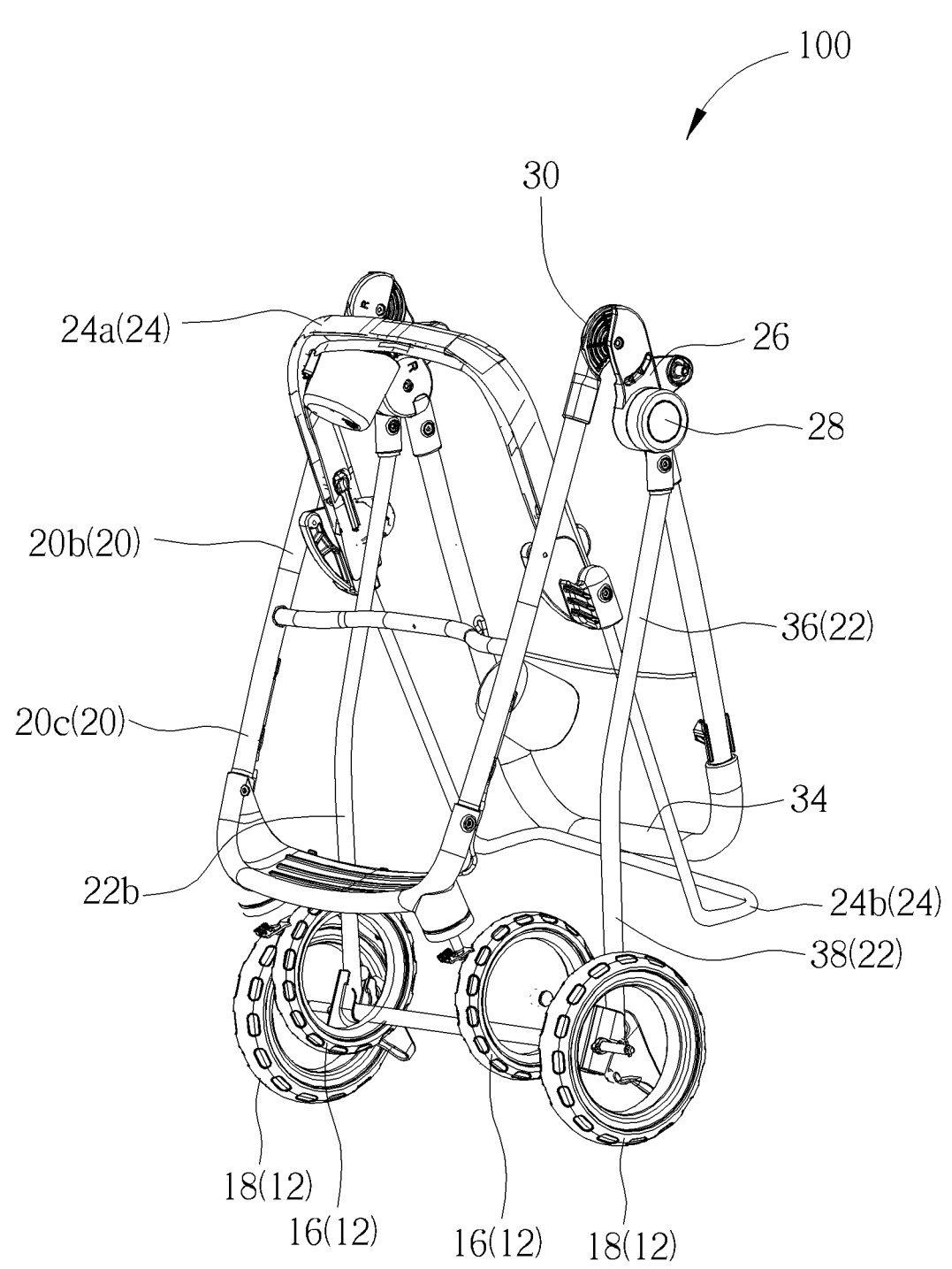
FIG. 5 is diagram of the stroller switched to the folded mode in another view according to the first embodiment of the present invention.

Please refer to FIG. 1 to FIG. 5. FIG. 1 and FIG. 2 respectively are diagrams of a stroller 100 switched to an unfolded mode in different views according to a first embodiment of the present invention. FIG. 3 and FIG. 4 respectively are diagrams of the stroller 100 switched from the unfolded mode to a folded mode in different views according to the first embodiment of the present invention. FIG. 5 is diagram of the stroller 100 switched to the folded mode in another view according to the first embodiment of the present invention. The stroller 100 includes a texture carrier 10, a wheel set 12 and a vehicle frame 14. The texture carrier 10 is shown in FIG. 1 and omitted in other figures for simplicity. The texture carrier 10 can be any possible material disposed on the vehicle frame 14 for comfortable sitting. The wheel set 12 includes a front wheel 16 and a rear wheel 18. Numbers of the front wheel 16 and the rear wheel 18 depend on a design demand of the vehicle frame 14, and are not limited to the embodiment shown in FIG. 1. The vehicle frame 14 is capable of holding the texture carrier 10. The vehicle frame 14 includes a first bar 20, a second bar 22, a third bar 24, a fourth bar 26 and a first pivot unit 28. The first bar 20, the second bar 22, the third bar 24 and the fourth bar 26 are pivoted to each other to form a four-bar linkage. The stroller 100 can be switched between the unfolded mode and the folded mode by the four-bar linkage. The first pivot unit 28 is preferably disposed between the second bar 22 and the fourth bar 26 or between any two bars, which depends on the design demand.

In the first embodiment, the first pivot unit 28 has a locking function, and preferably be disposed between the second bar 22 and the fourth bar 26. That is, the first pivot unit 28 is set on a higher position on the vehicle frame 14, and therefore the user can stand and conveniently operate the locking function to freely switch the stroller 100 into the unfolded mode or the folded mode. In a possible embodiment, the vehicle frame 14 further includes a second pivot unit 30 disposed on a pivoted position between the first bar 20 and the fourth bar 26. The second pivot unit 30 can be a latch mechanism hidden inside a lower case of the fourth bar 26, and a part (such as an operation component for pushing or pulling and not shown in the figures) of the second pivot unit 30 may be protruded from the fourth bar 26 and be controlled by the user. The second pivot unit 30 can be disposed on the fourth bar 26 and located under the first pivot unit 28, so that the user can still stand and conveniently control the second pivot unit 30 to freely switch the stroller 100 into the unfolded mode or the folded mode. If the vehicle frame 14 includes the second pivot unit 30, the first pivot unit 28 can optionally have or not have the locking function, which depends on the design demand.

In some possible embodiments, the first bar 20 and the fourth bar 26 are connected to form a closed loop structure. The front wheel 16 of the wheel set 12 is disposed on a bottom end 20a of the first bar 20. The rear wheel 18 of the wheel set 12 is disposed on a bottom end 22a of the second bar 22. The third bar 24 has a front section 24a and a rear section 24b connected to each other. The front section 24a can be a passenger's armrest of the stroller 100. A baby or a child can place the hand on the armrest for support, or a plate can be detachably installed on the armrest for putting food. The rear section 24b can be a holder of the vehicle frame 14, and a basket 32 of the stroller 100 can be installed on the rear section 24b. In some possible embodiments, the third bar 24 further includes a middle section 24c. The front section 24a, the rear section 24b and the middle section 24c are not coplanar. The front section 24a, the rear section 24b and the middle section 24c are connected to form another closed loop structure. An included angle between the rear section 24b and the middle section 24c is an obtuse angle.

The basket 32 is shown in FIG. 1 and omitted in other figures for simplicity. The basket 32 is detachably disposed on the third bar 24. The front section 24a of the third bar 24 is pivoted to an upper section 20b of the first bar 20. A lower section 20c of the first bar 20 is connected to the front wheel 16 via the bottom end 20a. A rear section 24b of the third bar 24 is pivoted to a lower section 22b of the second bar 22. The lower section 22b is connected to the rear wheel 18 via the bottom end 22a. The fourth bar 26 is disposed between the first bar 20 and the second bar 22. It should be mentioned that the stroller 100 can further include a handle 34 detachably disposed on the fourth bar 26. The user can grip the handle 34 to move the stroller 100 forward or backward, or to make a turn or stop.

The first pivot unit 28 can include several components, and structural features and assembly of the components are illustrated in the following description. As shown in FIG. 1 and FIG. 2, when the first pivot unit 28 and the stroller 100 are switched into the unfolded mode, the first bar 20 and the fourth bar 26 are stabilized at the same direction, which means an axial direction A1 of the first bar 20 is parallel to or substantially parallel to an axial direction A2 of the fourth bar 26, so that the front wheel 16 of the stroller 100 is distant from the rear wheel 18 of the stroller 100, and the vehicle frame 14 can be put on the ground and the infant can stably sit on the texture carrier 10. As shown in FIG. 3, FIG. 4 and FIG. 5, when the first pivot unit 28 and the stroller 100 are switched from the unfolded mode to the folded mode, the fourth bar 26 is rotated relative to the first bar 20 and the second bar 22 in a clockwise direction, which means the first bar 20 and the fourth bar 26 are not stabilized at the same direction, and the vehicle frame 14 is switched from the triangular form (such as the unfolded mode) shown in FIG. 1 and FIG. 2 to the tetragonal form (such as the folded mode) shown in FIG. 3, FIG. 4 and FIG. 5. The front wheel 16 is moved toward the rear wheel 18, and therefore the stroller 100 is folded to show a small size for easy storage and transportation.

In the first embodiment, the second bar 22 which is connected to the rear wheel 18 is pivoted to the fourth bar 26 via the first pivot unit 28. There is no bar connected between the second bar 22 and the fourth bar 26. The second bar 22 includes a first sub-bar 36 and a second sub-bar 38 bent to each other. The foresaid bottom end 22a is the bottom end of the second sub-bar 38. The foresaid lower section 22b is a part of the second sub-bar 38 or the whole section of the second sub-bar 38. The top end 361 of the first sub-bar 36 is pivoted to the fourth bar 26 via the first pivot unit 28. Two opposite ends of the second sub-bar 38 are respectively connected to the bottom end 362 of the first sub-bar 36 and the rear wheel 18. It should be mentioned that when the stroller 100 is switched from the folded mode to the unfolded mode, an included angle between an axial direction A3 of the first sub-bar 36 and a normal vector of the supporting surface (which means the normal vector of the ground) of the vehicle frame 14 is smaller than a predefined range, such as five degrees, so that the first sub-bar 36 can be substantially perpendicular to the ground. In addition, the second sub-bar 38 is bent relative to the first sub-bar 36 in a direction away from the first bar 20. Therefore, the front wheel 16 can be moved away from the rear wheel 18, and gravity of the texture carrier 10 whereon the infant sits can be located between the front wheel 16 and the rear wheel 18 and almost at a middle between the front wheel 16 and the rear wheel 18, so as to avoid the stroller 100 from rollover when being slightly crashed.

Figure 6:
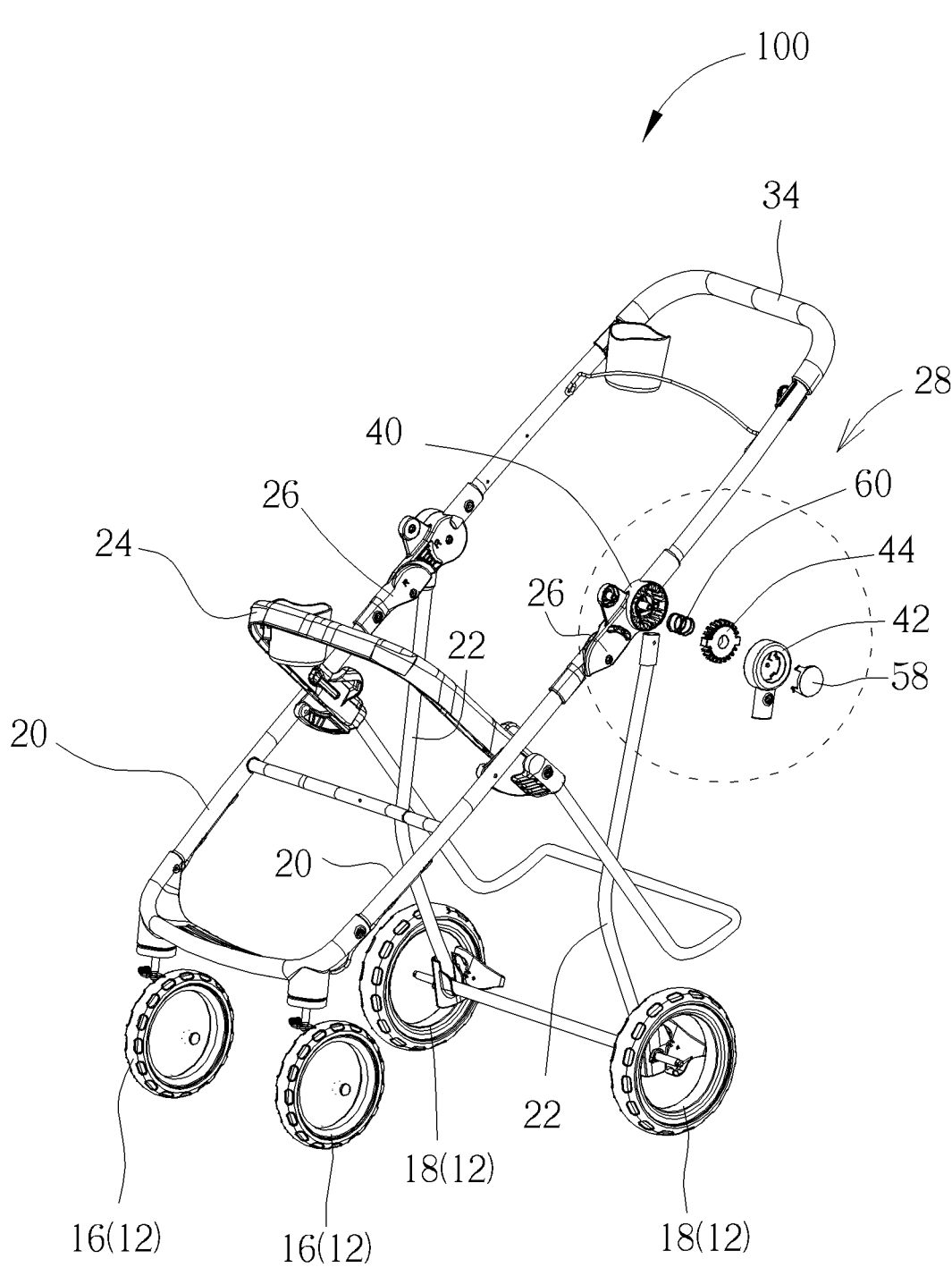
FIG. 6 is an exploded diagram of a part of the stroller according to the first embodiment of the present invention.
Figure 7:
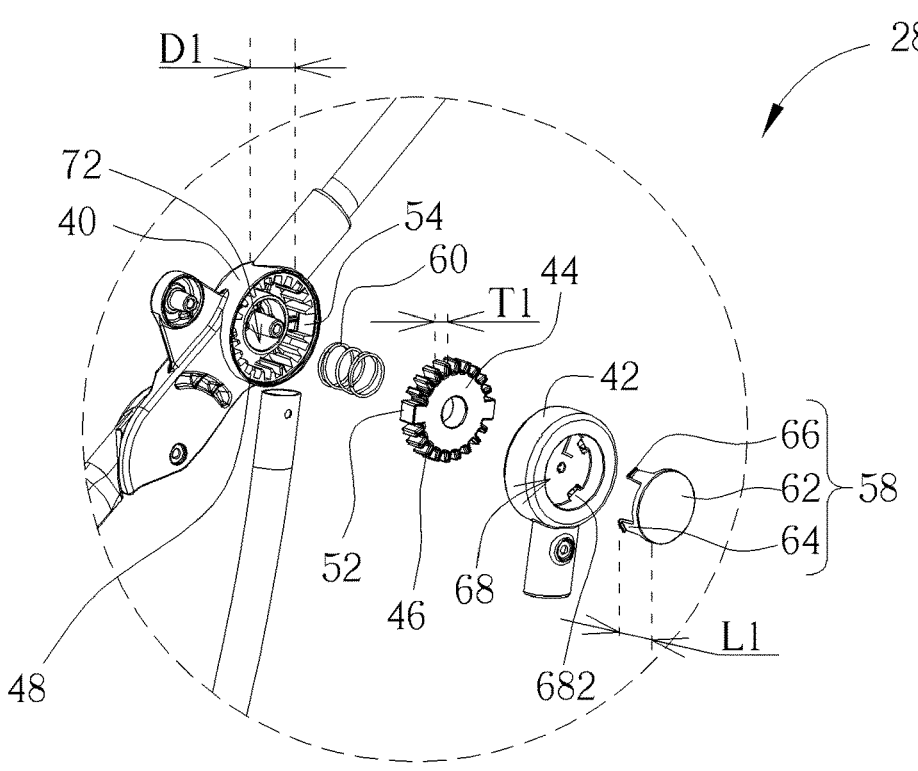
FIG. 7 is an exploded diagram of a first pivot unit according to the first embodiment of the present invention.
Figure 8:
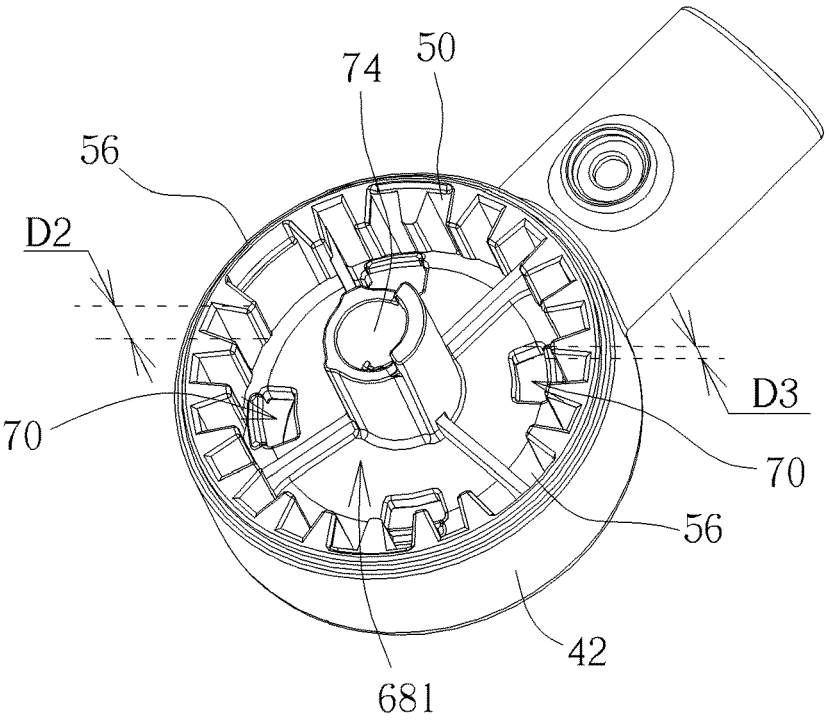
FIG. 8 is a diagram of a part of the first pivot unit in other view according to the first embodiment of the present invention.

Please refer to FIG. 6 to FIG. 8. FIG. 6 is an exploded diagram of a part of the stroller 100 according to the first embodiment of the present invention. FIG. 7 is an exploded diagram of the first pivot unit 28 according to the first embodiment of the present invention. FIG. 8 is a diagram of a part of the first pivot unit 28 in other view according to the first embodiment of the present invention. The first pivot unit 28 includes a first installation component 40, a second installation component 42 and a locking component 44. The first installation component 40 is disposed on the fourth bar 26. The second installation component 42 is disposed on the second bar 22. The locking component 44 is movably disposed between the first installation component 40 and the second installation component 42, and used to allow or constrain relative rotation between the second bar 22, the fourth bar 26 and the first bar 20. The locking component 44 has at least one engaging tooth 46; accordingly, the first installation component 40 has at least one first engaging slot 48, and the second installation component 42 has at least one second engaging slot 50. Types and positions of the engaging tooth 46, the first engaging slot 48 and the second engaging slot 50 are not limited to the first embodiment, and depend on the design demand. When the engaging tooth 46 is simultaneously inserted into the first engaging slot 48 and the second engaging slot 50, the relative rotation between the second bar 22 and the fourth bar 26 is constrained by the first pivot unit 28. When the engaging tooth 46 is removed from the second engaging slot 50 but stilled inserted inside the first engaging slot 48, the relative rotation between the second bar 22 and the fourth bar 26 is allowed by the first pivot unit 28.

As mentioned above, a thickness T1 of the engaging tooth 46 is preferably smaller than or equal to a depth D1 of the first engaging slot 48, and be further greater than a depth D2 of the second engaging slot 50. If the first pivot unit 28 is prepared to constrain the relative rotation between the second bar 22 and the fourth bar 26, the engaging tooth 46 can be inserted into the deep of the second engaging slot 50, or inserted into the second engaging slot 50 but does not contact the deep surface; in the meantime, the engaging tooth 46 can be partly protruded from the second engaging slot 50 and engaged with the first engaging slot 48 to generate structural interference, so that the fourth bar 26 cannot be rotated relative to the second bar 22. If the first pivot unit 28 is prepared to allow the relative rotation between the second bar 22 and the fourth bar 26, the engaging tooth 46 can be removed from the second engaging slot 50 and completely inserted into the first engaging slot 48; the engaging tooth 46 may be just accommodated inside the first engaging slot 48 (which means the thickness T1 of the engaging tooth 46 is equal to the depth D1 of the first engaging slot 48), or the engaging tooth 46 may be slightly moved inside the first engaging slot 48 and not interfered with the second engaging slot 50 (which means the thickness T1 of the engaging tooth 46 is smaller than the depth D1 of the first engaging slot 48).

Besides, the locking component 44 further includes at least one positioning tooth 52; accordingly, the first installation component 40 further includes at least one first positioning slot 54, and the second installation component 42 further includes at least one second positioning slot 56. If the positioning tooth 52 is simultaneously engaged with the first positioning slot 54 and the second positioning slot 56, the relative rotation between the second bar 22 and the fourth bar 26 is constrained by the first pivot unit 28, and a specific included angle between the second bar 22 and the fourth bar 26 is fixed, such as the unfolded mode shown in FIG. 1 and FIG. 2 and the folded mode shown in FIG. 5. A size and/or a type of the positioning tooth 52 can be different from a size and/or a type of the engaging tooth 46. The sizes and/or the types of the first engaging slot 48 and the second engaging slot 50 correspond to the size and/or the type of the engaging tooth 46. The sizes and/or the types of the first positioning slot 54 and the second positioning slot 56 correspond to the size and/or the type of the positioning tooth 52. In a process between the unfolded mode and the folded mode shown in FIG. 3 and FIG. 4, the engaging tooth 46 cannot be inserted into the first positioning slot 54 or the second positioning slot 56, and the positioning tooth 52 can be engaged with the first engaging slot 48 or the second engaging slot 50, so as to prevent an engaging function and a positioning function of the first pivot unit 28 from be interfered with each other.

The first pivot unit 28 further includes an unlocking component 58 and a resilient component 60. The unlocking component 58 is disposed on a side of the second installation component 42 opposite to the locking component 44, such as an outer surface of the first pivot unit 28. The user can easily touch and control the unlocking component 58 for related operation. The unlocking component 58 is used to push and move the locking component 44 toward the first installation component 40 for separating the locking component 44 from the second installation component 42. The engaging tooth 46 can be removed from the second engaging slot 50 and inserted into the first engaging slot 48, so as to allow the relative rotation between the second bar 22 and the fourth bar 26.

The unlocking component 58 includes a main body 62, an abutted portion 64 and a blocked portion 66. The main body 62 can be a plate or a flat piece, which depends on the design demand. The abutted portion 64 is disposed on an edge of the main body 62, and be outwardly protruded from the edge of the main body 62. The blocked portion 66 is disposed on an end of the abutted portion 64 opposite to the main body 62. The second installation component 42has a sunken structure 68 and a constraining hole 70. The constraining hole 70 is formed inside the sunken structure 68. A size and/or a type of the sunken structure 68 correspond to a size and/or a type of the main body 62. The main body 62 is movably disposed inside the sunken structure 68, and therefore the first pivot unit 28 has a thin-typed artistic appearance. The abutted portion 64 passes through the constraining hole 70 to abut against or separate from the locking component 44. The blocked portion 66 is used to block a bottom surface 681 of the sunken structure 68 when the abutted portion 64 and the locking component 44 are separated, so as to prevent the abutted portion 64 from being departed from the constraining hole 70.

Therefore, a length L1 of the abutted portion 64 is greater than a depth D3 of the constraining hole 70. The abutted portion 64 abuts against the locking component 44 when the main body 62 does not contact the bottom surface 682 of the sunken structure 68. When the unlocking component 58 is continuously pressed and the main body 62 is deeply moved into the sunken structure 68 to approach or touch the bottom surface 682, the abutted portion 64 is used to push the locking component 44 for separating the locking component 44 and the second installation component 42, so that the engaging tooth 46 is removed from the second engaging slot 50 to enter the first engaging slot 48 and allow the relative rotation between the second bar 22 and the fourth bar 26.

For constraining the relative rotation between the second bar 22 and the fourth bar 26, the unlocking component 58 should be moved from a position deeply located inside the sunken structure 68 to another position which is partly protruded from or aligns with an outer surface of the second installation component 42. The user can manually push or pull the unlocking component 58 to an initial position, or an automatic recovering function of the resilient component 60 can be applied for reposition of the unlocking component 58. The resilient component 60 is disposed between the first installation component 40 and the locking component 44, and a resilient recovering force of the resilient component 60 causes the locking component 44 to simultaneously engage with the first installation component 40 and the second installation component 42, which means the engaging tooth 46 can be inserted into the first engaging slot 48 and the second engaging slot 50 simultaneously, so as to constrain the relative rotation between the second bar 22 and the fourth bar 26. Accordingly, the first installation component 40 includes an accommodating chamber 72 used to accommodate the resilient component 60 and constrain resilient deformation and a deformed direction of the resilient component 60.

Figure 9:
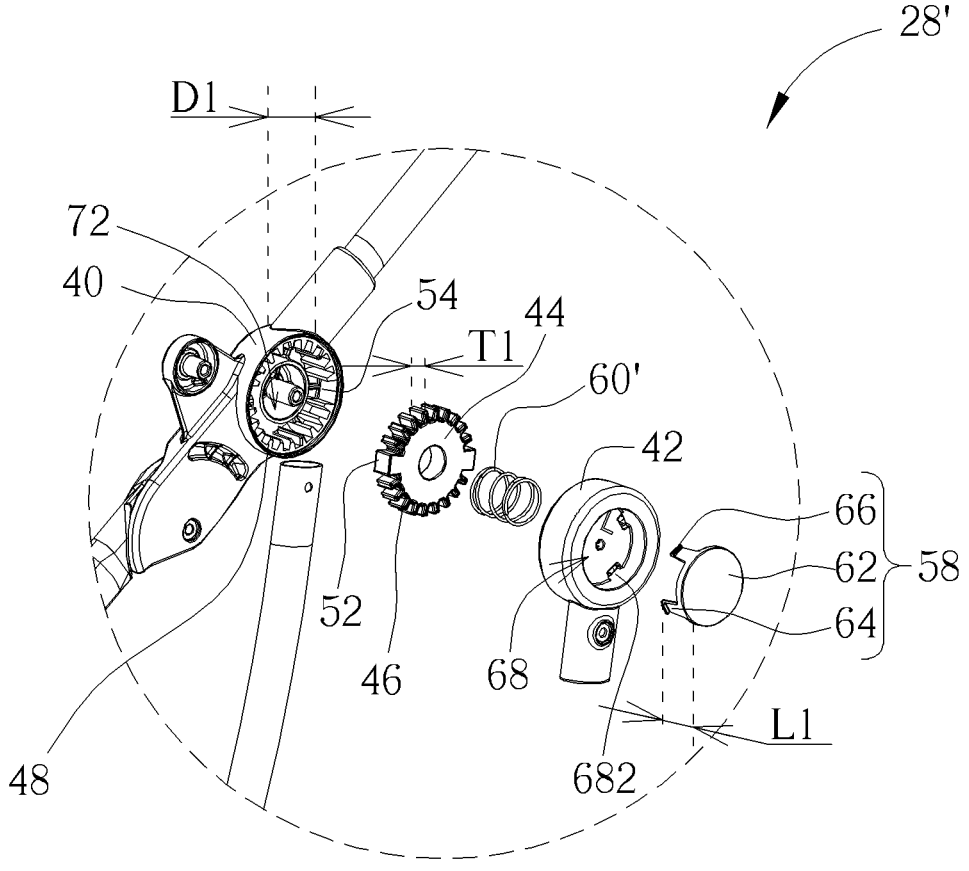
FIG. 9 is a diagram of the first pivot unit in another type according to the first embodiment of the present invention.

Please refer to FIG. 9. FIG. 9 is a diagram of the first pivot unit 28' in another type according to the first embodiment of the present invention. In the possible type, elements having the same numerals as ones of the original embodiment have the same structures and functions, and a detailed description is omitted herein for simplicity. The first pivot unit 28' further includes a resilient component 60' disposed between the second installation component 42 and the locking component 44. A resilient recovering force of the resilient component 60' is used to pull the locking component 44 to simultaneously engage with the first installation component 40 and the second installation component 42. The second installation component 42 includes an accommodating chamber 74 used to accommodate the resilient component 60'. A size and/or a type of the accommodating chamber 74 correspond to a size and/or a type of the resilient component 60'.

In some possible embodiments, components of the first pivot unit 28 can be exchanged by components of the second pivot unit 30.

Figure 10:
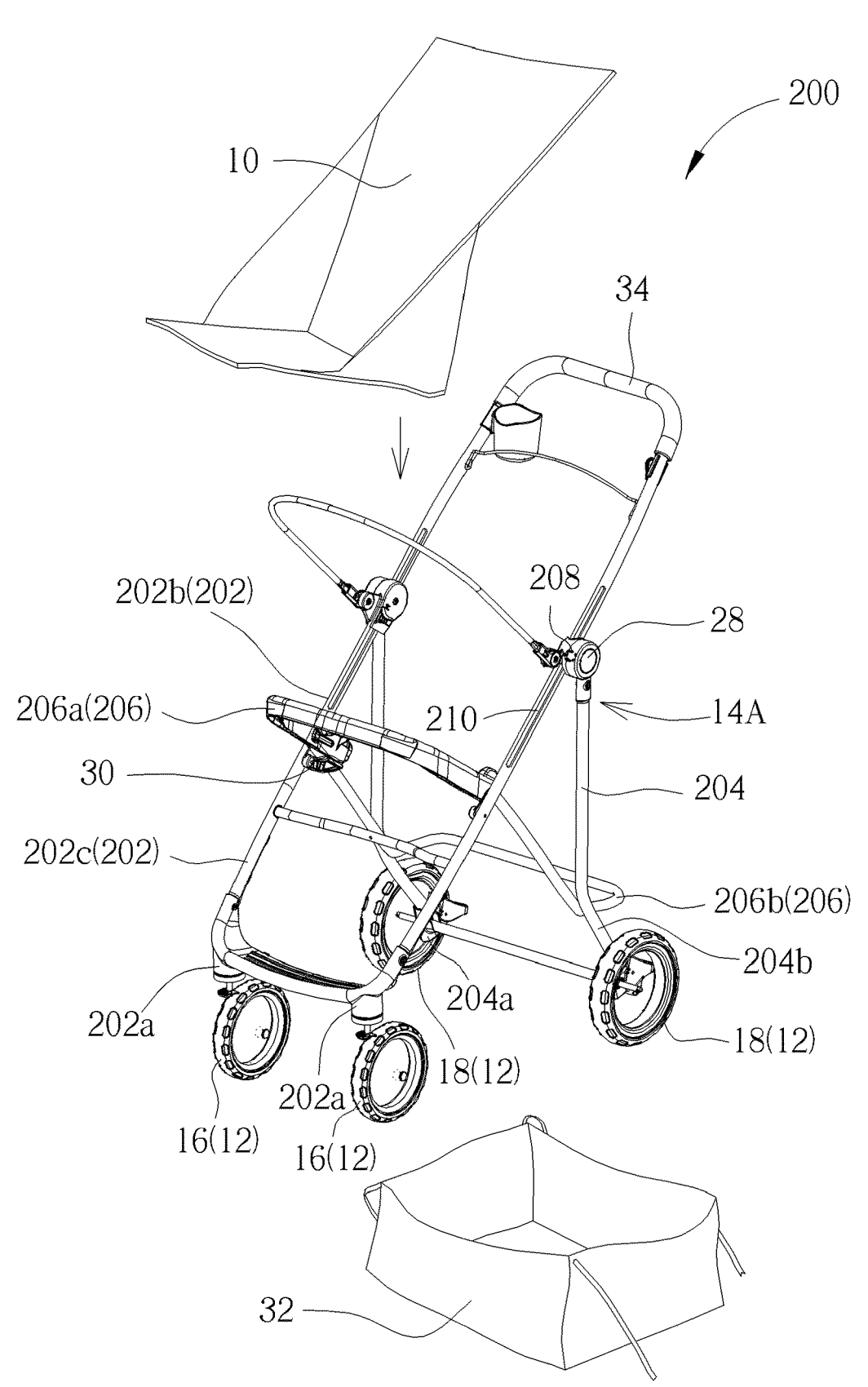
FIG. 10 is a diagram of the stroller according to a second embodiment of the present invention.

Please refer to FIG. 10. FIG. 10 is a diagram of the stroller 200 according to a second embodiment of the present invention. In the second embodiment, elements having the same numerals as ones of the first embodiment have the same structures and functions, and the detailed description is omitted herein for simplicity. The stroller 200 includes a texture carrier 10, a wheel set 12 and a vehicle frame 14A. The texture carrier 10 can be any possible material installed on the vehicle frame 14A for comfortable sitting. The wheel set 12 includes the front wheel 16 and the rear wheel 18. Numbers of the front wheel 16 and the rear wheel 18 depend on the design demand of the vehicle frame 14A, and are not limited to the second embodiment shown. The vehicle frame 14A holds the texture carrier 10. The vehicle frame 14 can include a first bar 202, a second bar 204, a third bar 206 and the first pivot unit 28. The first bar 202, the second bar 204 and the third bar 206 are pivoted to each other to form a three-bar linkage. The stroller 200 can be switched between the unfolded mode and the folded mode by the three-bar linkage. The first pivot unit 28 can be preferably disposed between the first bar 202 and the second bar 204 or between any two bars, which depends on the design demand.

In the second embodiment, the first pivot unit 28 can has the locking function, and preferably be disposed between the first bar 202 and the second bar 204. That is, the first pivot unit 28 is set on the higher position on the vehicle frame 14A, and therefore the user can stand and conveniently operate the locking function to freely switch the stroller 200 into the unfolded mode or the folded mode. The vehicle frame 14A further includes the second pivot unit 30 disposed on a pivoted position between the first bar 202 and the third bar 206. The second pivot unit 30 can be the latch mechanism hidden inside a case of the first bar 202 or the third bar 206, and a part (such as an operation component for pushing or pulling and not shown in the figures) of the second pivot unit 30 may be protruded from the first bar 202 or the third bar 206 and be controlled by the user. The second pivot unit 30 may be set on the high position or the middle position on the vehicle frame 14A, so that the user can stand and conveniently control the second pivot unit 30 to freely switch the stroller 200 into the unfolded mode or the folded mode. If the vehicle frame 14A includes the second pivot unit 30, the first pivot unit 28 can optionally have or not have the locking function, which depends on the design demand.

The front wheel 16 of the wheel set 12 is disposed on a bottom end 202a of the first bar 202. The rear wheel 18 of the wheel set 12 is disposed on a bottom end 204a of the second bar 204. The third bar 206 has a front section 206a and a rear section 206b connected to each other. The front section 206a can be the passenger's armrest of the stroller 200. A baby or a child can place the hand on the armrest for support, or a plate can be detachably installed on the armrest for putting food. The rear section 206b can be a holder of the vehicle frame 14A, and the basket 32 of the stroller 200 can be installed on the rear section 206b. The basket 32 can be detachably disposed on the third bar 206. The front section 206a of the third bar 206 is pivoted to an upper section 202b of the first bar 202. A lower section 202c of the first bar 202 is connected to the front wheel 16 via the bottom end 202a. The rear section 206b of the third bar 206 is pivoted to a lower section 204b of the second bar 204. The lower section 204b is connected to the rear wheel 18 via the bottom end 204a. The stroller 200 further includes the handle 34 detachably disposed on the first bar 202. The user can grip the handle 34 to move the stroller 200 forward or backward, or to make a turn or stop.

Figures 11, 12:
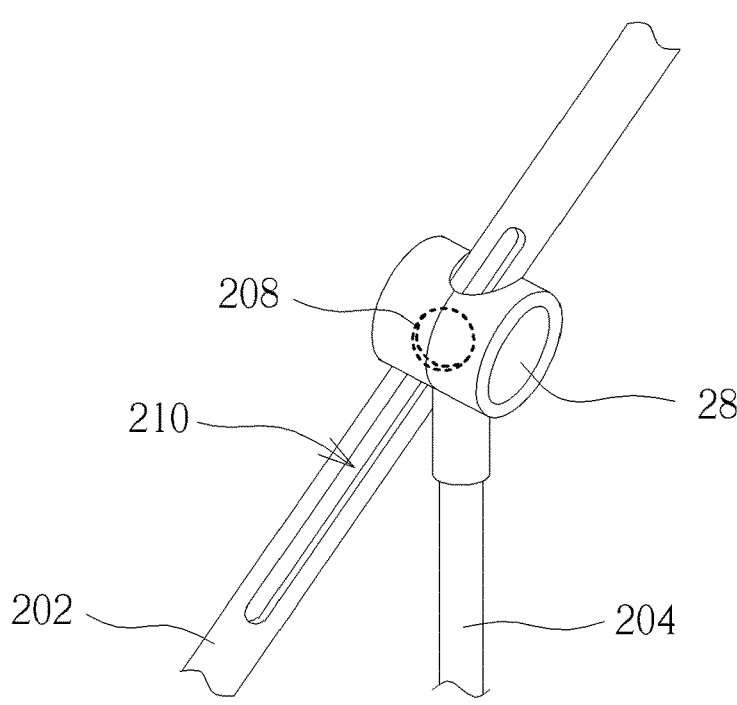
FIG. 11 and FIG. 12 are diagrams of the stroller in different operation modes according to the second embodiment of the present invention.

Please refer to FIG. 11 and FIG. 12. FIG. 11 and FIG. 12 are diagrams of the stroller 200 in different operation modes according to the second embodiment of the present invention. In the second embodiment, the second bar 204 is directly connected to the first bar 202 in a slidable and pivotable manner. If the first pivot unit 28 is disposed on the second bar 204, the first pivot unit 28 includes a first sliding portion 208, and the first bar 202 includes a second sliding portion 210. The first sliding portion 208 and the second sliding portion 210 respectively serve as a slider and a sliding slot, or any structures with similar functions. The slider can be slid relative to the sliding slot forwardly and backwardly, and further can be rotated relative to the sliding slot for changing a rotation angle between the first bar 202 and the second bar 204. As shown in FIG. 11, the first sliding portion 208 is located on an upper end of the second sliding portion 210; the three-bar linkage formed by the first bar 202, the second bar 204 and the third bar 206 are unfolded to show a triangular form, and the vehicle frame 14A is in the unfolded mode. As shown in FIG. 12, the first sliding portion 208 is moved to a lower end of the second sliding portion 210, and the three-bar linkage is folded to switch the vehicle frame 14A into the folded mode.

In conclusion, the vehicle frame and the stroller of the present invention utilizes the second bar to connect the handle and the rear wheel, and dispose the first pivot unit on the top end of the second bar. The user does not bend over to switch the stroller into the unfolded mode or the folded mode, and can directly press the unlocking component of the first pivot unit when standing near by the stroller, so that the vehicle frame and the stroller of the present invention have advantages of simple operation and convenient usage.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A vehicle frame comprising:
   a first bar connected with a front wheel;
   a second bar connected with a rear wheel directly;
   a third bar having a front section, a middle section and a rear section connected with each other to form a closed loop structure, the front section being pivoted to an upper section of the first bar, the rear section being pivoted to a lower section of the second bar, and the front section, the middle section and the rear section being in different planes;

a fourth bar pivoted between the first bar and the second bar; and a first pivot unit disposed between the second bar and the fourth bar, and movably switched between an unfolded mode and a folded mode, the first bar and the fourth bar being stabilized at the same direction via the first pivot unit switched to the unfolded mode so that the front wheel is distant from the rear wheel, the fourth bar being rotated relative to the first bar and the second bar via the first pivot unit switched to the folded mode so that the front wheel is moved toward the rear wheel, wherein the second bar is pivoted to the fourth bar through the first pivot unit, upon the first pivot unit being switched from the unfolded mode to the folded mode, the front section is configured to move away from the front wheel, and the first pivot unit comprises a locking component that is movable to constrain or allow relative rotation between the second bar and the fourth bar.

2. The vehicle frame of claim 1, wherein the second bar comprises a first sub-bar and a second sub-bar bent to each other, a top end of the first sub-bar is pivoted to the fourth bar through the first pivot unit, two ends of the second sub-bar are respectively connected to a bottom end of the first sub-bar and the rear wheel.

3. The vehicle frame of claim 2, wherein the second sub-bar is bent relative to the first sub-bar toward a direction away from the first bar.

4. The vehicle frame of claim 2, wherein an included angle between an axial direction of the first sub-bar and a normal vector of a supporting surface whereon the vehicle frame is disposed is smaller than a predefined range when the vehicle frame is switched from the folded mode to the unfolded mode.

5. The vehicle frame of claim 1, wherein the first pivot unit has a locking function, or the vehicle frame further comprises a second pivot unit disposed on a pivoted position between the first bar and the fourth bar.

6. The vehicle frame of claim 1, wherein the first pivot unit further comprises a first installation component and a second installation component, the first installation component is disposed on the fourth bar, the second installation component is connected to the second bar, the locking component is movably disposed between the first installation component and the second installation component.

7. The vehicle frame of claim 6, wherein the locking component comprises an engaging tooth, the first installation component comprises a first engaging slot, the second installation component comprises a second engaging slot, the engaging tooth is simultaneously inserted into the first engaging slot and the second engaging slot to constrain the relative rotation between the second bar and the fourth bar, the engaging tooth is removed from the second engaging slot and still inserted inside the first engaging slot to allow the relative rotation between the second bar and the fourth bar.

8. The vehicle frame of claim 7, wherein the locking component comprises a positioning tooth, the first installation component comprises a first positioning slot, the second installation component comprises a second positioning slot, the positioning tooth is simultaneously engaged with the first positioning slot and the second positioning slot to constrain a specific included angle formed between the second bar and the fourth bar.

9. The vehicle frame of claim 8, wherein a size and/or a type of the positioning tooth is different from a size and/or a type of the engaging tooth.

10. The vehicle frame of claim 7, wherein a depth of the first engaging slot is greater than or equal to a thickness of the engaging tooth, and the thickness of the engaging tooth is greater than a depth of the second engaging slot.

11. The vehicle frame of claim 6, wherein the first pivot unit further comprises an unlocking component disposed on a side of the second installation component opposite to the locking component, and adapted to push the locking component away from the second installation component.

12. The vehicle frame of claim 11, wherein the unlocking component comprises a main body and an abutted portion, the abutted portion is protruded from an edge of the main body outwardly, the second installation component comprises a sunken structure and a constraining hole, the constraining hole is formed inside the sunken structure, the main body is movably disposed inside the sunken structure, and the abutted portion passes through the constraining hole to abut against the locking component.

13. The vehicle frame of claim 12, wherein a length of the abutted portion is greater than a depth of the constraining hole, the abutted portion abuts against the locking component when the main body does not contact a bottom surface of the sunken structure.

14. The vehicle frame of claim 13, wherein the abutted portion pushes the locking component to separate from the second installation component when the main body contacts the bottom surface of the sunken structure.

15. The vehicle frame of claim 12, wherein the unlocking component further comprises a blocked portion disposed on an end of the abutted portion opposite to the main body and blocking another bottom surface of the sunken structure to avoid the abutted portion and the constraining hole from separation.

16. The vehicle frame of claim 6, wherein the first pivot unit further comprises a resilient component disposed between the first installation component and the locking component, a resilient recovering force of the resilient component pushes the locking component to simultaneously engage with the first installation component and the second installation component.

17. The vehicle frame of claim 16, wherein the first installation component comprises an accommodating chamber adapted to accommodate the resilient component and constrain resilient deformation of the resilient component.

18. The vehicle frame of claim 6, wherein the first pivot unit further comprises a resilient component disposed between the second installation component and the locking component, a resilient recovering force of the resilient component pulls the locking component to simultaneously engage with the first installation component and the second installation component.

19. A stroller comprising:

a texture carrier;

a wheel set comprising a front wheel and a rear wheel; and a vehicle frame adapted to hold the texture carrier, the vehicle frame comprising:

a first bar, a bottom end of the first bar being connected with the front wheel;

a second bar, a bottom end of the second bar being connected with the rear wheel directly;

a third bar having a front section, a middle section and a rear section connected with each other to form a closed loop structure, the front section being pivoted to an upper section of the first bar, the rear section being pivoted to a lower section of the second bar, and the front section, the middle section and the rear section being in different planes;

a fourth bar pivoted between the first bar and the second bar; and a first pivot unit disposed between the second bar and the fourth bar, and movably switched between an unfolded mode and a folded mode, the first bar and the fourth bar being stabilized at the same direction via the first pivot unit switched to the unfolded mode so that the front wheel is distant from the rear wheel, the fourth bar being rotated relative to the first bar and the second bar via the first pivot unit switched to the folded mode so that the front wheel is moved toward the rear wheel, wherein the second bar is pivoted to the fourth bar through the first pivot unit, upon the first pivot unit being switched from the unfolded mode to the folded mode, the front section is configured to move away from the front wheel, and the first pivot unit comprises a locking component that is movable to constrain or allow relative rotation between the second bar and the fourth bar.

20. The stroller of claim 19, wherein the stroller further comprises a handle detachably connected to the fourth bar of the vehicle frame.

21. The stroller of claim 19, wherein the stroller further comprises a basket detachably connected to the third bar of the vehicle frame.

\* \* \* \* \*